United States Patent
Weber et al.

(10) Patent No.: US 11,085,387 B2
(45) Date of Patent: Aug. 10, 2021

(54) SYSTEMS AND METHODS FOR PERFORMING ENGINE DE-RATE CONTROL OPERATION OF A VEHICLE

(71) Applicants: CUMMINS INC., Columbus, IN (US); AGILITY FUEL SYSTEMS, INC., Santa Ana, CA (US)

(72) Inventors: Gregory A. Weber, Greensburg, IN (US); Todd F. Sloan, Kelowa (CA); Eric Coupal-Sikes, Santa Monica, CA (US); Morgan M. Andreae, Columbus, IN (US); Jean-Patrick V. Rich, Nashville, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/609,656

(22) PCT Filed: Apr. 30, 2018

(86) PCT No.: PCT/US2018/030199
§ 371 (c)(1),
(2) Date: Oct. 30, 2019

(87) PCT Pub. No.: WO2018/204258
PCT Pub. Date: Nov. 8, 2018

(65) Prior Publication Data
US 2020/0056558 A1 Feb. 20, 2020

Related U.S. Application Data

(60) Provisional application No. 62/492,262, filed on Apr. 30, 2017.

(51) Int. Cl.
*F02D 41/04* (2006.01)
*B60K 15/03* (2006.01)
*F02M 55/02* (2006.01)

(52) U.S. Cl.
CPC .............. *F02D 41/04* (2013.01); *B60K 15/03* (2013.01); *F02M 55/025* (2013.01);
(Continued)

(58) Field of Classification Search
CPC ............. F02D 41/04; F02D 2200/0602; F02D 2200/0614; F02D 2200/101;
(Continued)

(56) References Cited

U.S. PATENT DOCUMENTS 6,092,504 A 7/2000 Barnes et al.
7,634,985 B2 * 12/2009 Parker ................. F02D 41/3836
123/435

(Continued)

FOREIGN PATENT DOCUMENTS

WO 2013/086345 6/2013
WO 2014/158495 10/2014

OTHER PUBLICATIONS

International Search Report dated Aug. 8, 2018 in corresponding International Application No. PCT/US2018/030199.
(Continued)

*Primary Examiner* — Hieu T Vo
(74) *Attorney, Agent, or Firm* — Faegre Drinker Biddle & Reath LLP

(57) ABSTRACT

Methods and systems, using a controller (20), for performing de-rate operation of an engine (12) is disclosed. Controller (20) includes a de-rate condition detection unit (204), an operational parameter adjustment unit (206), and a de-rate condition monitoring unit (208). De-rate condition detection unit (204) detects a low fuel condition based on a current delivery pressure level of the engine (12) detected at least one of: in a fuel tank (24) and along an inlet fuel rail (38) connecting the fuel tank (24) to the engine (12). Operational parameter adjustment unit (206) performs the
(Continued)

de-rate operation on the engine (12) by adjusting one or more operational parameters related to an engine (12) load based on the detected low fuel condition. De-rate condition monitoring unit (208) monitors the detected low fuel condition for a predetermined time period in response to the operational parameter adjustment performed by operational parameter adjustment unit (206).

24 Claims, 3 Drawing Sheets

(52) U.S. Cl.
CPC ............... *B60K 2015/03217* (2013.01); *F02D 2200/0602* (2013.01); *F02D 2200/0614* (2013.01); *F02D 2200/101* (2013.01); *F02D 2250/18* (2013.01)

(58) Field of Classification Search
CPC .. F02D 2250/18; F02M 55/025; B60K 15/03; B60K 2015/03217
See application file for complete search history.

(56) References Cited

U.S. PATENT DOCUMENTS

| | | |
|---|---|---|
| 8,095,285 B2 | 1/2012 | Schifferer et al. |
| 8,266,905 B2 | 9/2012 | Reynolds et al. |
| 9,234,471 B2 | 1/2016 | Young et al. |
| 2010/0148952 A1 | 6/2010 | Barajas |
| 2011/0153141 A1 | 6/2011 | Beechie et al. |
| 2012/0095667 A1 | 4/2012 | Hase |
| 2013/0197777 A1 | 8/2013 | Sloan et al. |

OTHER PUBLICATIONS

International Preliminary Report on Patentability received for PCT Patent Application No. PCT/US2018/030199, dated Aug. 20, 2019, 15 pages.

* cited by examiner

SYSTEMS AND METHODS FOR PERFORMING ENGINE DE-RATE CONTROL OPERATION OF A VEHICLE

CROSS REFERENCE

This application claims the benefit of U.S. Provisional Application Ser. No. 62/492,262, filed on Apr. 30, 2017, titled "SYSTEMS AND METHODS FOR PERFORMING ENGINE DE-RATE CONTROL OPERATION OF A VEHICLE," the disclosure of which is expressly incorporated by reference herein.

FIELD OF THE DISCLOSURE

The present disclosure generally relates to vehicle control systems for internal combustion engines, and more specifically to engine de-rate control systems for preventing engine performance degradation.

BACKGROUND OF THE DISCLOSURE

A conventional vehicle control system operatively coupled to an internal combustion engine includes an engine control system and a fuel control system, and uses various sensors to monitor engine operating conditions. Specifically, a gaseous fuel engine operated by liquid fuel, such as compressed natural gas (CNG), liquefied natural gas (LNG), or the like, functions much like a gasoline engine. For example, a fuel-air mixture is compressed and ignited by a spark plug. The fuel control system causes the liquid fuel to be transferred in gaseous form from a fuel tank to the engine. A fuel pressure is reduced by the fuel control system to a level compatible with the engine control system by the time the liquid fuel reaches the engine.

However, when a low fuel condition is detected by the fuel control system, the engine control system may encounter engine performance degradation, such as an engine stall event or an engine misfire event, during operation of a vehicle due to a low delivery pressure level in the vehicle. Without sufficient fuel pressure, the vehicle does not run reliably and continued operation of the vehicle in this condition may result in permanent engine damage and unnecessary maintenance or repair expenses. Accordingly, it is desirable to develop a control system that improves operational limits of the gaseous fuel engine and prevents the vehicle from stalling upon a low fuel condition.

SUMMARY OF THE DISCLOSURE

In one embodiment, the present disclosure provides a system for performing de-rate operation of an engine includes a controller having a de-rate condition detection unit, an operational parameter adjustment unit, and a de-rate condition monitoring unit. The de-rate condition detection unit is configured to detect a low fuel condition based on a current delivery pressure level of the engine detected at least one of: in a fuel tank and along an inlet fuel rail connecting the fuel tank to the engine. The operational parameter adjustment unit is configured to perform the de-rate operation on the engine by adjusting one or more operational parameters related to an engine load based on the detected low fuel condition. The de-rate condition monitoring unit is configured to monitor the detected low fuel condition for a predetermined time period in response to the operational parameter adjustment performed by the operational parameter adjustment unit.

In one aspect of this embodiment, the de-rate condition detection unit determines that the low fuel condition is satisfied when the current delivery pressure level is less than a minimum delivery pressure level of the engine for a predetermined time period. In a variant of this aspect, the de-rate condition detection unit determines that the low fuel condition is satisfied when the current delivery pressure level is within a predetermined range greater than a minimum delivery pressure level of the engine. In another variant, the de-rate condition detection unit is configured to detect the low fuel condition based on a fuel level detected in the fuel tank. In a further variant, the de-rate condition detection unit determines that the low fuel condition is satisfied when the fuel level is incapable of generating a maximum fuel mass flow rate of the engine. In a further variant, the de-rate condition detection unit determines that the low fuel condition is satisfied when the fuel level is incapable of maintaining a maximum fuel mass flow rate of the engine for a predetermined time period.

In another aspect of this embodiment, the operational parameter adjustment unit adjusts the one or more operational parameters by reducing an engine speed by a predetermined value. In a variant of this aspect, the operational parameter adjustment unit adjusts the one or more operational parameters by reducing an engine torque by a predetermined value. In another variant, the operational parameter adjustment unit adjusts the one or more operational parameter by replacing a current maximum fuel mass flow rate of the engine with a new maximum fuel mass flow rate that is less than the current maximum fuel mass flow rate.

In yet another aspect of this embodiment, the de-rate condition monitoring unit is configured to instruct the controller to actuate one or more components of the engine based on the adjusted one or more operational parameters. In another variant, the de-rate condition monitoring unit is configured to anticipate the low fuel condition based on historical data before the low fuel condition is detected by the de-rate condition detection unit. In yet another variant, the controller further includes a display unit configured to display data related to the de-rate operation of the engine.

In another embodiment of the present disclosure, a method of a controller for performing de-rate operation of an engine is disclosed. Included in the method are detecting, using the controller, a low fuel condition based on a current delivery pressure level of the engine detected at least one of: in a fuel tank and along an inlet fuel rail connecting the fuel tank to the engine; performing, using the controller, the de-rate operation on the engine by adjusting one or more operational parameters related to an engine load based on the detected low fuel condition; and monitoring, using the controller, the detected low fuel condition for a predetermined time period in response to the operational parameter adjustment.

In one aspect of this embodiment, the method includes determining that the low fuel condition is satisfied when the current delivery pressure level is less than a minimum delivery pressure level of the engine for a predetermined time period, determining that the low fuel condition is satisfied when the current delivery pressure level is within a predetermined range greater than a minimum delivery pressure level of the engine, detecting the low fuel condition based on a fuel level detected in the fuel tank, determining that the low fuel condition is satisfied when the fuel level is incapable of generating a maximum fuel mass flow rate of the engine, and determining that the low fuel condition is satisfied when the fuel level is incapable of maintaining a maximum fuel mass flow rate of the engine for a predetermined time period.

In another aspect of this embodiment, the method includes adjusting the one or more operational parameters by reducing an engine speed by a predetermined value, adjusting the one or more operational parameters by reducing an engine torque by a predetermined value, adjusting the one or more operational parameter by replacing a current maximum fuel mass flow rate of the engine with a new maximum fuel mass flow rate that is less than the current maximum fuel mass flow rate.

In yet another aspect of this embodiment, the method includes instructing the controller to actuate one or more components of the engine based on the adjusted one or more operational parameters, anticipating the low fuel condition based on historical data before the low fuel condition is detected by the controller, and displaying data related to the de-rate operation of the engine.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
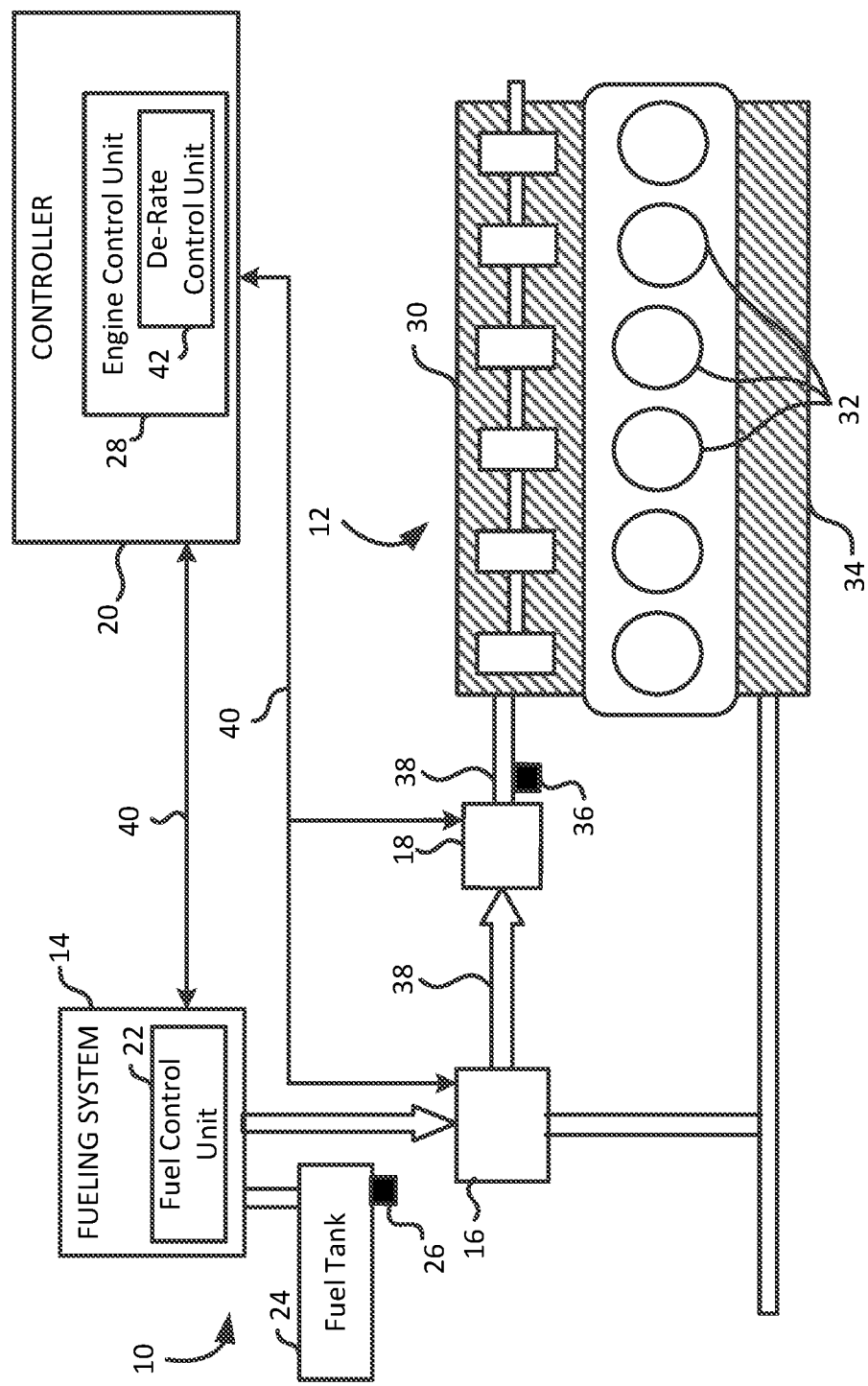
FIG. 1 is a schematic illustration of an exemplary internal combustion engine system having a de-rate control system in accordance with embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

FIG. 1 shows an exemplary internal combustion engine system 10 of a vehicle including an engine 12, a fueling system 14 including a fuel mixer 16 to mix air with fuel and/or with a recirculated air/fuel mixture. In this example, engine 12 is a gaseous fuel engine operated by liquid fuel, such as compressed natural gas (CNG), liquefied natural gas (LNG), or the like. Other suitable types of engines using gaseous fuels, such as liquefied hydrogen, propane, or other pressurized fuels, are also contemplated to suit different applications. The air/fuel mixture is supplied to a fuel metering assembly or throttle 18, or back to fuel mixer system 16 for mixing with fresh air and fuel in accordance with a signal provided by a controller 20.

As used herein, "gas charge" refers to gases supplied to fuel metering assembly 18. In this example, fueling system 14 includes a fuel control unit 22 configured to control an amount of fuel supplied from a fuel tank 24 to fuel mixer 16. A fuel tank pressure sensor 26 monitors a pressure level inside fuel tank 24, and report a pressure reading to an engine control unit (ECU) 28. Engine 12 includes intake manifold 30 receiving the gas charge from fuel metering assembly 18, cylinders 32 to combust the gas charge, and exhaust manifold 34 receiving combustion gases from cylinders 32 and supplying the combusted gases to a charging subsystem as desired. In this example, a fuel rail pressure sensor 36 monitors a pressure level in an inlet fuel rail 38 and report a pressure reading to ECU 28. A location of fuel rail pressure sensor 36 varies depending on applications, and the location can be any suitable position along inlet fuel rail 38 between fuel tank 24 and engine 12. For example, fuel rail pressure sensor 36 is attached to inlet fuel rail 38 to generate a fuel rail pressure signal for feedback control of fuel rail pressure by ECU 28.

In a normal condition, if any drop in pressure is detected in either fuel tank 24 or inlet fuel rail 38, ECU 28 compensates so that fuel control unit 22 can restore a proper pressure level. In a low fuel condition, however, ECU 28 performs an automatic de-rate operation to lighten an engine load. Detailed descriptions of the de-rate operation are provided below in paragraphs relating to FIGS. 2 and 3. In FIG. 1, controller 20 includes ECU 28 operable to produce control signals on any one or more of signal paths 40 to control the operation of one or more corresponding suitably positioned engine components, such as fueling system 14, fuel mixer 16, or fuel metering assembly 18. One or more engine systems related the engine load, such as engine torque or horsepower, and other engine parameters, such as an engine speed or revolution per minute (RPM), are also controlled by ECU 28 for regulating operation of engine system 10. ECU 28 is in communication with a controller area network (CAN) or other serial bus systems for communicating with various components and sensors on engine 12 and/or within the vehicle.

ECU 28 includes a de-rate control unit 42 configured for detecting the low fuel condition based on a current delivery pressure level detected in fuel tank 24 and along inlet fuel rail 38 connecting fuel tank 24 to engine 12. A low delivery pressure level is detected when the current delivery pressure level reaches a minimum delivery pressure level required for normal operation of engine 12. The minimum delivery pressure level is dynamic depending on the configuration of engine 12. In one example, de-rate control unit 42 performs control steps to automatically de-rate the engine load, such as engine torque or horsepower, for preventing an engine stall event. Such a strategy allows for continuous operation of engine 12 even in the low fuel condition for a predetermined time period until the fuel is replenished in fuel tank 24. Advantageously, de-rate control unit 42 prevents unwanted stalling or malfunction of engine 12 during the low fuel condition or other conditions that cause the low delivery pressure level in fuel tank 24 or inlet fuel rail 38.

Figure 2:
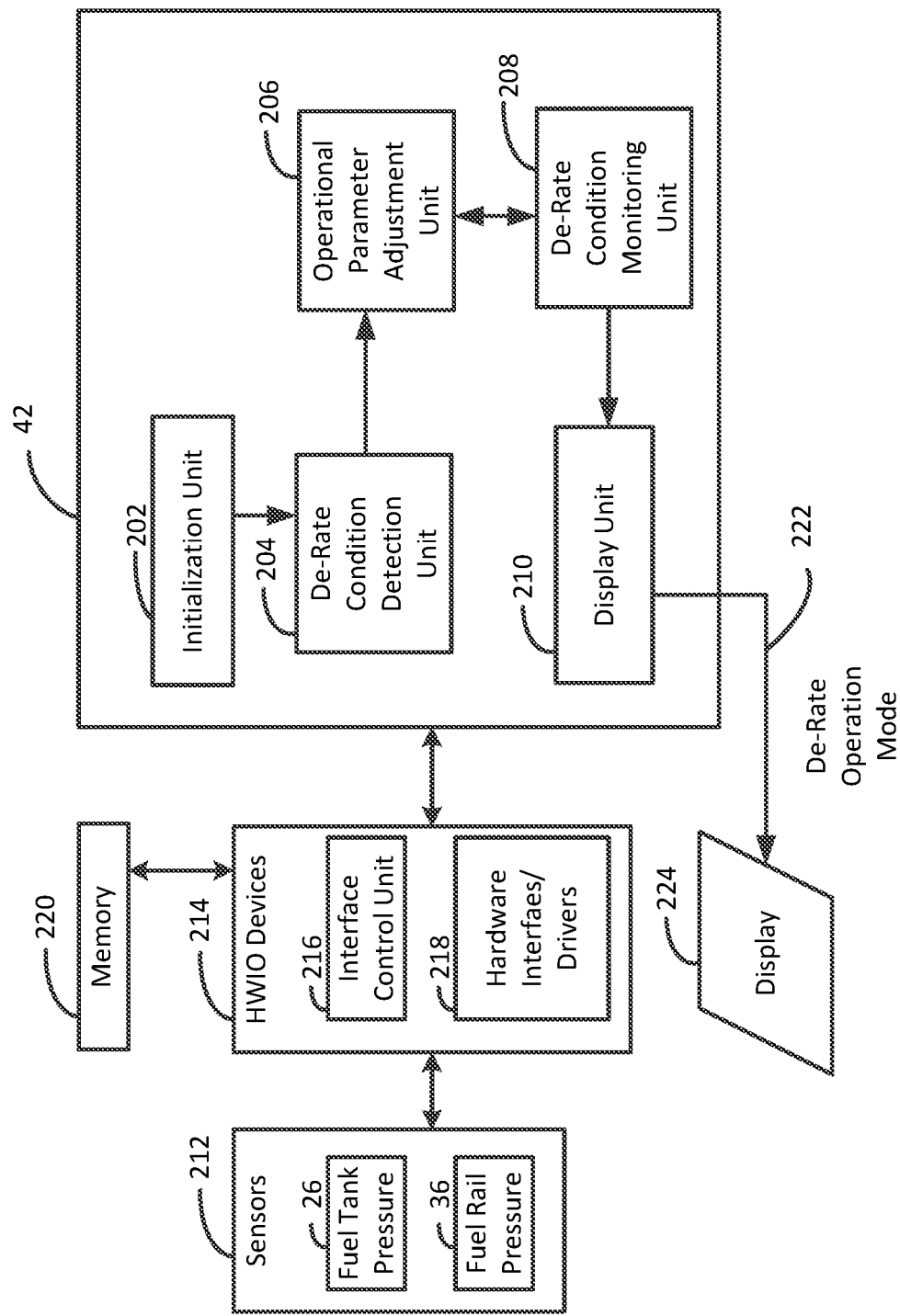
FIG. 2 is a functional block diagram of the control unit of FIG. 1 featuring related units and components associated with the de-rate control system in accordance with embodiments of the present disclosure.

FIG. 2 shows an exemplary de-rate control unit 42 featuring its sub-units in accordance with embodiments of the present disclosure. In this example, de-rate control unit 42 includes an initialization unit 202, a de-rate condition detection unit 204, an operational parameter adjustment unit 206, a de-rate condition monitoring unit 208, and a display unit 210. Initialization unit 202 receives signals from sensors 212 via hardware input/output (HWIO) devices 214. In one example, HWIO devices 214 include an interface control unit 216 and hardware interfaces/drivers 218. Interface control unit 216 provides an interface between the units 202-210, and hardware interfaces/drivers 218. Hardware interfaces/drivers 218 control operation of, for example, a camshaft phaser position sensor, a pressure sensor, an engine speed sensor, and other engine system components. Other engine system components include ignition coils, spark plugs, throttle valves, solenoids, etc. Hardware interface/drivers 218 also receive sensor signals, which are communicated to the control unit 42. Memory 220 is operatively coupled to HWIO devices 214 to store and retrieve operational data and parameters. Memory 220 can be part of ECU 28 or separate from ECU 28.

As an example only, interface control unit 216 is communicably coupled to controller 20, and provides commands to controller 20 corresponding to a desired position of one or more valves, provides commands to controller 20 wherein at least one of the commands causes controller 20 to modify at least one of: an operational parameter of engine 12 and a mode of operation of engine 12, and receives one or more parameter signals corresponding to an operational parameter of engine 12. Although sub-units 202-224 are shown separately for illustration purposes, any combinations of sub-units are also contemplated to suit different applications.

In this example, sensors 212 include fuel tank pressure sensor 26 and fuel rail pressure sensor 36, but other suitable sensors, such as an intake air temperature sensor or an engine speed sensor, are contemplated to suit different applications. Initialization unit 202 generates an initialization signal based on the signals from sensors 212 and determines whether to enable de-rate condition detection unit 204 by verifying that various initialization conditions are met. For example, the initialization conditions include ensuring that engine 12 satisfies a minimum operation condition, e.g., engine 12 is operable at a predetermined engine speed for a predetermined time period. When the initialization conditions are met, initialization unit 202 generates and transmits the initialization signal to de-rate condition detection unit 204.

During engine operation, de-rate condition detection unit 204 is configured to detect a low fuel condition based on a current delivery pressure level detected at least one of: in fuel tank 24 and along inlet fuel rail 38 connecting fuel tank 24 to engine 12. In one example, as the fuel is drawn from fuel tank 24, the current delivery pressure level decreases toward a minimum delivery pressure level required for normal operation of engine 12. An exemplary delivery pressure level of fuel tank 24 is approximately 250 pounds per square inch (psi). The delivery pressure level from fuel tank 24 is gradually reduced along inlet fuel rail 38 as being closer to engine 12. An exemplary maximum delivery pressure level of inlet fuel rail 38 is approximately 100 psi and an exemplary minimum delivery pressure level of inlet fuel rail 38 is approximately 70 psi. De-rate condition detection unit 204 determines that the low fuel condition is satisfied when the current delivery pressure level is less than the minimum delivery pressure level for a predetermined time period (e.g., 30 seconds).

In some embodiments, de-rate condition detection unit 204 determines that the low fuel condition is satisfied when the current delivery pressure level is within a predetermined range greater than the minimum delivery pressure level (e.g., 5 psi above the minimum delivery pressure level of 70 psi, which ranges between 75 and 70.1 psi). In this arrangement, de-rate condition detection unit 204 ensures that the current delivery pressure level does not reach the minimum delivery pressure level such that no fault code is tripped by ECU 28. As a result, no malfunction indicator lamp is turned on that indicates an active fault condition of engine 12. For example, no yellow or red dashboard lamps are lit to indicate the active fault condition of engine 12. Advantageously, the de-rate operation is proactively and automatically performed by de-rate control unit 42 before the minimum delivery pressure level is reached. This enables the vehicle to be moved to an adequate location or to arrive at a fuel filling station without active faults on engine 12 due to the low fuel condition.

In another example, de-rate condition detection unit 204 is configured to detect the low fuel condition based on a fuel level detected in fuel tank 24. As the fuel is drawn from fuel tank 24, the fuel level becomes inadequate to generate a maximum fuel mass flow rate of engine 12 in inlet fuel rail 38. Typically, a default maximum fuel mass flow rate is established by a manufacturer of engine 12 and its threshold value is stored in a calibration table of memory 220. De-rate condition detection unit 204 determines that the low fuel condition is satisfied when the fuel level is incapable of generating the maximum fuel mass flow rate of engine 12, or maintaining the maximum fuel mass flow rate for a predetermined time period, due to the fuel level in fuel tank 24.

Operational parameter adjustment unit 206 is configured to perform de-rate operation on engine 12 by adjusting one or more operational parameters related to an engine load, such as engine torque or horsepower, based on the detected low fuel condition. In one example, operational parameter adjustment unit 206 adjusts the operational parameters by reducing an engine speed (e.g., RPM) by a predetermined value (e.g., percentage (%)) based on an offset value relative to the minimum delivery pressure level. The offset value refers to a displacement value (or a delta) between the minimum delivery pressure level and the current delivery pressure level. For example, the more the current delivery pressure level of engine 12 is departed from the minimum delivery pressure level, the more the engine speed is reduced to compensate the offset value. As such, a reduction percentage of the engine speed is determined based on the offset value. For example, the engine speed reduction is commensurate with the offset value relative to the minimum delivery pressure level.

In another example, operational parameter adjustment unit 206 adjusts the operational parameters by reducing an engine torque (e.g., pound-force-feet (lb-ft)) by a predetermined value (e.g., percentage (%)) based on the offset value relative to the minimum delivery pressure level. As with the engine speed, the reduction percentage of the engine torque is commensurate with the offset value relative to the minimum delivery pressure level. For example, operational parameter adjustment unit 206 reduces engine power from 1000 lb-ft to 900 lb-ft, resulting in a 10% reduction in engine torque when the current delivery pressure level is at 67 psi which is 3 psi lower than the minimum 70 psi pressure level (e.g., a 10% pressure decrease from the minimum delivery pressure level relative to a 30 psi pressure range between the minimum and maximum delivery pressure levels). Other suitable reduction techniques, such as a stepped decrease or a single decrease in pressure, are contemplated to suit different applications. It is also contemplated that the reduction percentage of the engine speed or the engine torque ranges from zero to a hundred percent (0-100%).

In yet another example, operational parameter adjustment unit 206 adjusts the operational parameter by replacing a current maximum fuel mass flow rate of engine 12 with a new maximum fuel mass flow rate that is less than the current maximum fuel mass flow rate. For example, operational parameter adjustment unit 206 calculates the new maximum fuel mass flow rate based on at least one of: an engine system pressure, an engine displacement, a maximum rated fuel flow rate, a gas temperature, an ambient temperature, and at least one component in a fuel flow path for engine 12. The at least one component in the fuel flow path includes a fuel line diameter, a fuel line length, a valve configuration, a tubing or fitting arrangement, a number of components, a number of bends (e.g., "U"- or "L"-shaped), a pressure regulator configuration, a fuel filter, an intake manifold, and the like. Other suitable component parameters, such as a volumetric flow rate, are contemplated to suit different applications. ECU 28 continually maps the new maximum fuel mass flow rate to a torque curve which defines a new maximum power level (e.g., torque) of engine 12.

De-rate condition monitoring unit 208 is configured to monitor the detected low fuel condition for a predetermined time period in response to the operational parameter adjustment performed by operational parameter adjustment unit 206. In one example, de-rate condition monitoring unit 208 is configured to instruct ECU 28 to actuate one or more components of engine 12 based on the adjusted operational parameters. Further, de-rate condition monitoring unit 208 generates a de-rate operation mode signal and transmits the de-rate operational mode signal to display unit 210 for display. In some embodiments, other sub-units 204 or 206 can generate and transmit the de-rate operational mode signal to suit different applications.

In one example, when fuel tank pressure sensor 26 indicates the pressure level inside fuel tank 24 is greater than a predetermined threshold (e.g., 200 psi), de-rate condition monitoring unit 208 instructs operational parameter adjustment unit 206 to adjust one or more operational parameters, such as the engine speed or torque, back to a previous value set before the detected low fuel condition. In another example, when fuel rail pressure sensor 36 indicates the pressure level in inlet fuel rail 38 is greater than a predetermined threshold (e.g., 70 psi), de-rate condition monitoring unit 208 instructs operational parameter adjustment unit 206 to adjust one or more operational parameters back to the previous value set before the detected low fuel condition.

In yet another example, when the fuel level of fuel tank 24 is greater than a predetermined threshold (e.g., 5% full in fuel tank), de-rate condition monitoring unit 208 instructs operational parameter adjustment unit 206 to adjust one or more operational parameters, such as the maximum fuel mass flow rate, back to the previous value set before the detected low fuel condition. For example, when fuel tank 24 is re-fueled to a level above the minimum delivery pressure level to achieve the default maximum fuel mass flow rate of engine 12, the de-rate operation is deactivated.

In some embodiments, de-rate condition monitoring unit 208 is configured to anticipate the low fuel condition based on historical data stored in memory 220 before the low fuel condition is detected by de-rate condition detection unit 204. For example, a set of threshold values related to the low fuel condition is learned by de-rate condition monitoring unit 208 based on a feedback control loop established between engine 12 and fueling system 14. It is contemplated that de-rate condition monitoring unit 208 is configured to anticipate the low fuel condition based on output values of at least one of: sensors 212, an engine system pressure, an engine displacement, a maximum rated fuel flow rate, a gas temperature, an ambient temperature, and at least one component in the fuel flow path for engine 12. Any combinations of these output values can be used to create a historical pattern or model, and the low fuel condition is thus anticipated based on the historical pattern or model recognized or learned by de-rate condition monitoring unit 208.

Display unit 210 is configured to display data related to the de-rate operation of engine 12. In one example, display unit 210 receives and outputs the de-rate operation mode signal for display, e.g., on a display device 224. For example, the de-rate operation mode signal is presented on a screen or printed on a paper for viewing in real-time, wherein the data related to the de-rate operation mode signal corresponds to the operational parameters of engine 12. For example, a smart display system is used to display textual or graphical illustrations representing a percentage based data about a difference between a total engine power and a de-rated engine power in RPM or lb-ft. In some embodiments, a fleet manager or other users are notified by an alert or warning message, for example, using a telematics device available in the vehicle. Other suitable presentation methods are contemplated to suit the application.

As described above, it is advantageous that de-rate control unit 42 provides control logic that extends a range of the vehicle at a reduced performance while also protecting engine 12 from engine performance degradation, such as the engine stall or misfire event as the fuel level in fuel tank 24 becomes low (e.g., approximately 10% or less). For example, a driver or other users are notified of the de-rate operation and a severity level of the low fuel condition is displayed in percentage values. For example, as the fuel level gets lower, a degree of the de-rate operation increases until the vehicle cannot be moved on its own power.

Figure 3:
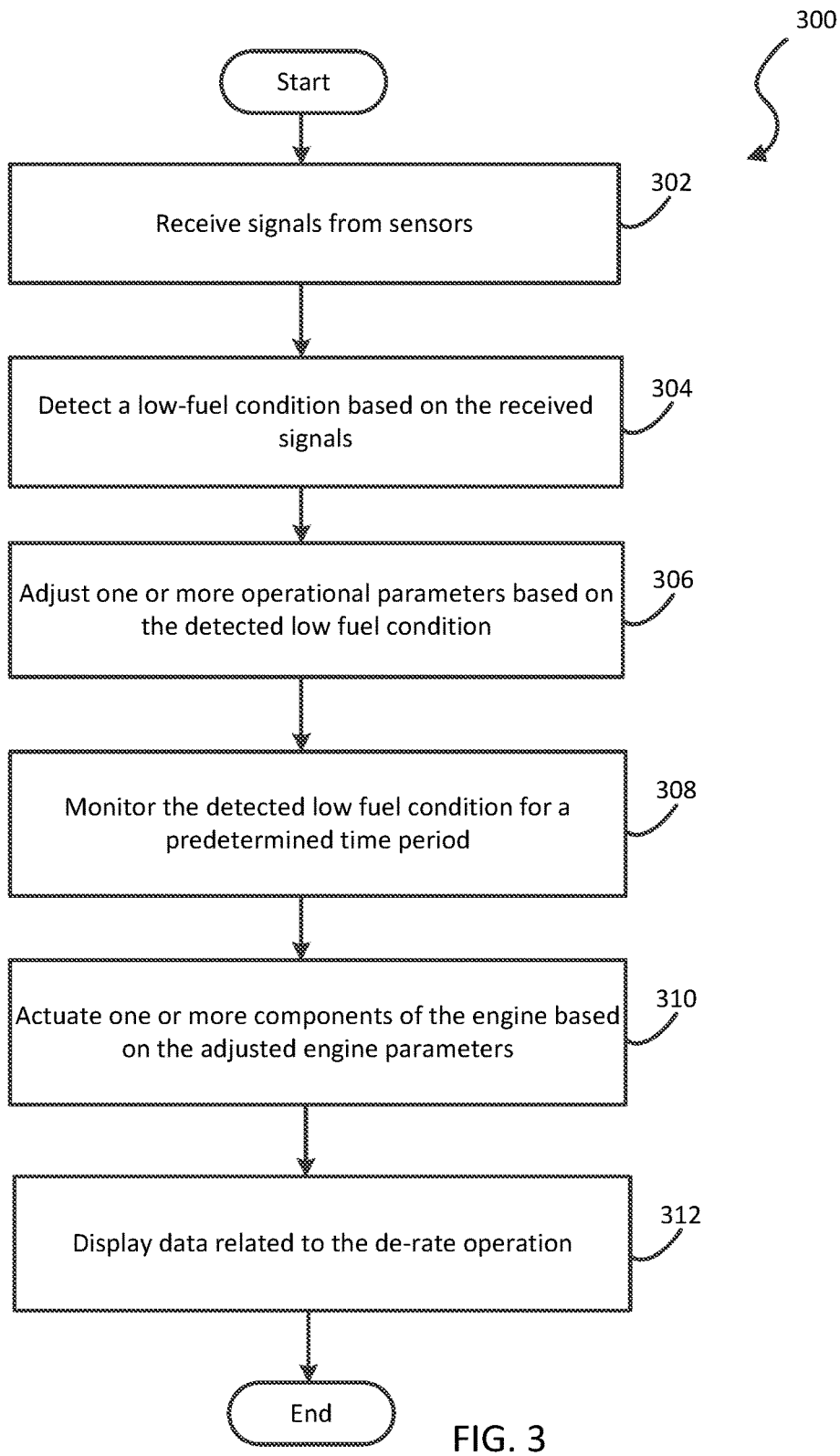
FIG. 3 is a flowchart illustrating one example of a method of performing automatic de-rate control operation of a vehicle in accordance with embodiments of the present disclosure.

FIG. 3 shows an exemplary method of performing de-rate operation of a vehicle in accordance with embodiments of the present disclosure. It will be described with reference to FIGS. 1 and 2. However, any suitable structure can be employed. Although sub-blocks 302-312 are illustrated, other suitable sub-blocks can be employed to suit different applications. It should be understood that the blocks within the method can be modified and executed in a different order or sequence without altering the principles of the present disclosure.

In operation, at block 302, initialization unit 202 receives signals from sensors 212 via HWIO devices 214, and transmits the signals to de-rate condition detection unit 204 for determining whether a low fuel condition is satisfied. At block 304, de-rate condition detection unit 204 detects the low fuel condition based on a current delivery pressure level detected at least one of: in fuel tank 24 and along inlet fuel rail 38 connecting fuel tank 24 to engine 12. At block 306, operational parameter adjustment unit 206 is configured to perform a de-rate operation on engine 12 by adjusting one or more operational parameters related to an engine load, such as engine torque or horsepower, based on the detected low fuel condition. At block 308, de-rate condition monitoring unit 208 monitors the detected low fuel condition for a predetermined time period in response to the operational parameter adjustment performed by operational parameter adjustment unit 206. At block 310, de-rate condition monitoring unit 208 instructs ECU 28 to actuate one or more components of engine 12 based on the adjusted operational parameters. At block 312, display unit 210 displays data related to the de-rate operation of engine 12.

Embodiments of the present disclosure are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

Furthermore, while the above description describes hardware in the form of a processor executing code, hardware in the form of a state machine, or dedicated logic capable of producing the same effect, other structures are also contemplated. Although the sub-units 202-210 are illustrated as children units subordinate of the parent unit 42, each sub-unit can be operated as a separate unit from ECU 28, and other suitable combinations of sub-units are contemplated to suit different applications. Also, although the units 202-210 are illustratively depicted as separate units, the functions and capabilities of each unit can be implemented, combined, and used in conjunction with/into any unit or any combination of units to suit different applications.

In further embodiments, although engine 12 is illustrated as a gaseous fuel engine operated by liquid fuel, the present disclosure, such as de-rate control unit 42, can be applied to any internal combustion engines using fossil fuels like natural gas or petroleum products such as gasoline, diesel fuel, fuel oil, or the like. Moreover, other renewable fuels, such as biodiesel for compression ignition engines and bioethanol or methanol for spark ignition engines can utilize the present disclosure. It is also contemplated that the present disclosure is similarly applicable to battery electric vehicles (BEVs) operated by an electric vehicle battery or traction battery. Any secondary or rechargeable battery operated vehicles can also implement the present disclosure for the de-rate operation.

In one example, a vehicle having an electric powertrain can use de-rate control unit 42 to detect a low battery power condition and execute the de-rate operation as described above. The low battery power condition is determined based on one or more battery-related operational parameters, such as voltage, battery temperature, ambient temperature, chemistry properties or type, battery material type, battery construction configuration, power consumption rates, electric current (e.g., ampere), and the like. For example, a maximum battery power consumption level can be reduced from 120 kilowatts per hour to 75 kilowatts per hour, or 10% reduction can be applied to a total battery power to de-rate the associated engine. In another example, when a current battery power level becomes below a predetermined state of charge (SOC), de-rate control unit 42 lowers the horsepower of the BEV, hybrid vehicle, or plug-in hybrid electric vehicle, or the like, by a certain percentage (e.g., 100 horsepower to 90 horsepower, or 10% reduction). Other suitable arrangements are also contemplated.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the present disclosure should, therefore, be determined with reference to the appended claims, along with the full scope of equivalents to which such claims are entitled.

What is claimed is:

1. A system for performing de-rate operations of an engine, comprising:
   a controller including:
      a de-rate condition detection unit configured to detect a low fuel condition based on a current delivery pressure level of the engine detected along an inlet fuel rail connecting a fuel tank to the engine;
      an operational parameter adjustment unit configured to perform a de-rate operation on the engine by adjusting one or more operational parameters related to an engine load based on the detected low fuel condition; and
      a de-rate condition monitoring unit configured to monitor the detected low fuel condition for a predetermined time period in response to adjusting the one or more operational parameters by the operational parameter adjustment unit.

2. The system of claim 1, wherein the de-rate condition detection unit determines that the low fuel condition is satisfied when the current delivery pressure level is less than a minimum delivery pressure level of the engine for the predetermined time period.

3. The system of claim 1, wherein the de-rate condition detection unit determines that the low fuel condition is satisfied when the current delivery pressure level is within a predetermined range greater than a minimum delivery pressure level of the engine.

4. The system of claim 1, wherein the de-rate condition detection unit is further configured to detect the low fuel condition based on a fuel level detected in the fuel tank.

5. The system of claim 4, wherein the de-rate condition detection unit determines that the low fuel condition is satisfied when the fuel level is incapable of generating a maximum fuel mass flow rate of the engine.

6. The system of claim 4, wherein the de-rate condition detection unit determines that the low fuel condition is satisfied when the fuel level is incapable of maintaining a maximum fuel mass flow rate of the engine for the predetermined time period.

7. The system of claim 1, wherein the operational parameter adjustment unit adjusts the one or more operational parameters by reducing an engine speed by a predetermined value.

8. The system of claim 1, wherein the operational parameter adjustment unit adjusts the one or more operational parameters by reducing an engine torque by a predetermined value.

9. The system of claim 1, wherein the operational parameter adjustment unit adjusts the one or more operational parameter by replacing a current maximum fuel mass flow rate of the engine with a new maximum fuel mass flow rate that is less than the current maximum fuel mass flow rate.

10. The system of claim 1, wherein the de-rate condition monitoring unit is further configured to instruct the controller to actuate one or more components of the engine based on the adjusted one or more operational parameters.

11. The system of claim 1, wherein the de-rate condition monitoring unit is further configured to anticipate the low fuel condition based on historical data before the low fuel condition is detected by the de-rate condition detection unit.

12. The system of claim 1, wherein the controller further comprises a display unit configured to display data related to the de-rate operation of the engine.

13. A method of a controller for performing de-rate operations of an engine, comprising:
   detecting, using the controller, a low fuel condition based on a current delivery pressure level of the engine detected along an inlet fuel rail connecting a fuel tank to the engine;
   performing, using the controller, a de-rate operation on the engine by adjusting one or more operational parameters related to an engine load based on the detected low fuel condition; and
   monitoring, using the controller, the detected low fuel condition for a predetermined time period in response to adjusting the one or more operational parameters.

14. The method of claim 13, further comprising determining that the low fuel condition is satisfied when the current delivery pressure level is less than a minimum delivery pressure level of the engine for the predetermined time period.

15. The method of claim 13, further comprising determining that the low fuel condition is satisfied when the current delivery pressure level is within a predetermined range greater than a minimum delivery pressure level of the engine.

16. The method of claim 13, further comprising detecting the low fuel condition based on a fuel level detected in the fuel tank.

17. The method of claim 16, further comprising determining that the low fuel condition is satisfied when the fuel level is incapable of generating a maximum fuel mass flow rate of the engine.

18. The method of claim 16, further comprising determining that the low fuel condition is satisfied when the fuel level is incapable of maintaining a maximum fuel mass flow rate of the engine for the predetermined time period.

19. The method of claim 13, further comprising adjusting the one or more operational parameters by reducing an engine speed by a predetermined value.

20. The method of claim 13, further comprising adjusting the one or more operational parameters by reducing an engine torque by a predetermined value.

21. The method of claim 13, further comprising adjusting the one or more operational parameter by replacing a current maximum fuel mass flow rate of the engine with a new maximum fuel mass flow rate that is less than the current maximum fuel mass flow rate.

22. The method of claim 13, further comprising instructing the controller to actuate one or more components of the engine based on the adjusted one or more operational parameters.

23. The method of claim 13, further comprising anticipating the low fuel condition based on historical data before the low fuel condition is detected by the controller.

24. The method of claim 13, further comprising displaying data related to the de-rate operation of the engine.

* * * * *